(12) United States Patent
Kahn et al.

(10) Patent No.: US 9,092,123 B1
(45) Date of Patent: Jul. 28, 2015

(54) METHOD AND APPARATUS TO PROVIDE MOVEMENT-BASED ANALYTICS

(71) Applicants: Philippe Kahn, Santa Cruz, CA (US); Arthur Kinsolving, Santa Cruz, CA (US)

(72) Inventors: Philippe Kahn, Santa Cruz, CA (US); Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 162 days.

(21) Appl. No.: 13/736,868

(22) Filed: Jan. 8, 2013

Related U.S. Application Data (60) Provisional application No. 61/584,783, filed on Jan. 9, 2012.

(51) Int. Cl.
*G06F 3/00* (2006.01)
*G06F 3/0484* (2013.01)
*G06T 11/20* (2006.01)

(52) U.S. Cl.
CPC ............ *G06F 3/0484* (2013.01); *G06T 11/203* (2013.01)

(58) Field of Classification Search
CPC .................. A63B 24/0062; A63B 2024/0065; A63B 2220/00
USPC ......................................................... 715/772
See application file for complete search history.

(56) References Cited

U.S. PATENT DOCUMENTS

| | | | |
|---|---|---|---|
| 6,705,972 B1 * | 3/2004 | Takano et al. ..................... 482/8 |
| 8,814,754 B2 * | 8/2014 | Weast et al. ........................ 482/8 |
| 2007/0073558 A1 * | 3/2007 | Hall et al. .......................... 705/2 |
| 2011/0054838 A1 * | 3/2011 | Rottler et al. ................. 702/160 |
| 2011/0191343 A1 * | 8/2011 | Heaton et al. ................. 707/737 |
| 2011/0197157 A1 * | 8/2011 | Hoffman et al. .............. 715/772 |
| 2013/0197857 A1 * | 8/2013 | Lu et al. .......................... 702/141 |
| 2013/0325358 A1 * | 12/2013 | Oshima et al. .................. 702/19 |

\* cited by examiner

*Primary Examiner* — Omar Abdul-Ali
(74) *Attorney, Agent, or Firm* — HIPLegal LLP; Judith A. Szepesi (57) ABSTRACT

A visual display of user data, based on a motion sensor is described. In one embodiment, the visual display comprises a first plurality of time units, indicating an activity level for each time unit during a day portion of a day, and a fitted smooth goal curve, indicating a goal activity level, the goal activity level indicating a goal activity for each of the first time units, the goal activity level based on an overall goal setting and a goal curve defining activity levels throughout the day.

20 Claims, 10 Drawing Sheets

METHOD AND APPARATUS TO PROVIDE MOVEMENT-BASED ANALYTICS

RELATED CASES

The present application claims prior to U.S. Provisional Patent Application No. 61/584,783, filed on Jan. 9, 2012.

FIELD

The present invention is drawn to analytics and more particularly to movement-based analytics.

BACKGROUND

As accelerometers become more common, smaller, and low-power consumption, users increasingly have accelerometer-based data available to them.

The accelerometer data may be used in a step-counter or pedometer, to count a user's steps. In the prior art, pedometers generally allow a user to set a step count goal (e.g. 10,000 steps for the day) and then show a current step count. Some prior art pedometers enable the user to upload the pedometer results to their computer to track results over multiple days.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

The system discussed includes a way of providing a monitor to track movement data, and a visual monitor to display to the user information based on the tracking data. In one embodiment, the layout shows days and nights' activity, and a fitted curve. In one embodiment, the user's goals may be set by shape. This provides a visual tool to motivate and provide information to the user.

Figure 7A:
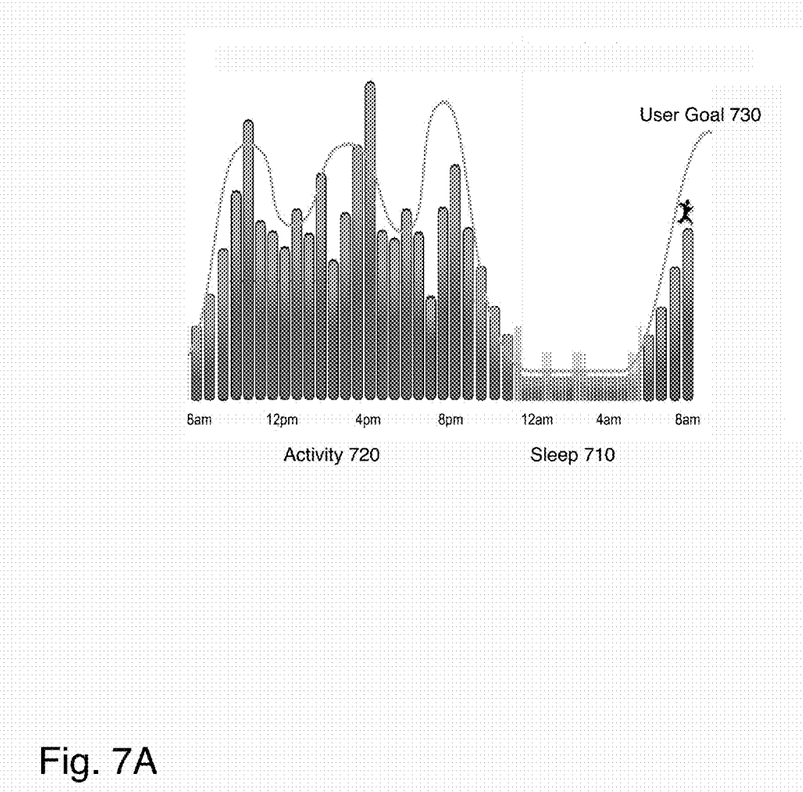
FIG. 7A is an illustration of one embodiment of the display including the goal curve.

In one embodiment, the visual tool shows activity and sleep in a chronological (timeline) view, shown in FIG. 7A. In one embodiment, colors or patterns are used to differentiate between different portions of the timeline. In one embodiment, the timeline is divided into two major categories, sleep 710, and activity 720. Sleep plots show various sleep phases, in one embodiment. In one embodiment, sleep phases shown may include awake, light sleep, and deep sleep. In one embodiment, the sleep phases shown may include awakeness and the five stages of sleep. Activity plots are shown in activity-level per unit time, in one embodiment. In one embodiment, the periods in the day when the user is more active are displayed as tall bars and the periods when the user is less active is shown as short bars. In one embodiment, bars may represent a time unit such as 30 minutes.

In one embodiment, the graph may further include a user goal 730. In one embodiment, the overall pattern for most users is a fitted smooth curve, such as sinusoidal line 730. The pattern shows a high level of activity during the day when user is expected to be active and low levels of activity at night for deep sleep and rest. The goal 730, in one embodiment, is very dynamic in nature. Instead of using a simple static threshold, the goal 730 uses patterns. In one embodiment, the goals can be based on many variables, and evolve with time. In one embodiment, the system adjusts user goals based on external data, as well as the user's past behavior. External data may include weather, season (how much daylight is available, how likely is it that the user can be outside), allergen levels, hormonal patterns, general health (flu, cold), etc.

For example, in the exemplary goal pattern 730 shown in FIG. 7A, the user goal includes three more intense periods of activity during the day. Other users may have differently shaped goal lines. For example, for some, the goal may be an increased level of activity after lunch and after work, with lower activity levels through the other portions of the day. In one embodiment, the user's sleep goals are different depending on the nature of the activity the user has been doing. In one embodiment, the display may further incorporate information about other aspects of the user's day, such as mood, exercise levels, food consumption, medications, or other aspects of the user's lifestyle that may impact the user's health or wellbeing.

Thus, the system shows a complete graphical timeline where sleep and activity are logically represented together, and optionally other information is also added. This visualization ensures that users can easily understand how activity and sleep affect each other, and can easily see their goals and how close they are to reaching those goals.

Figure 8A:
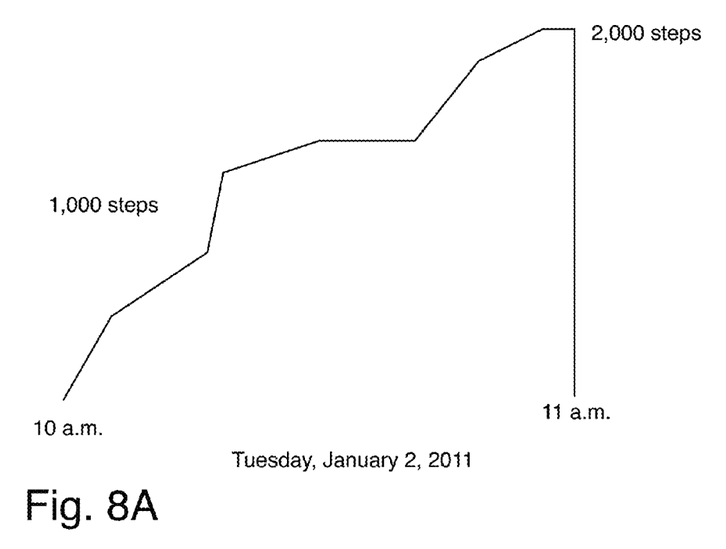
FIGS. 8A and 8B are illustrations of one embodiment of the zoomed displays.
Figure 8B:
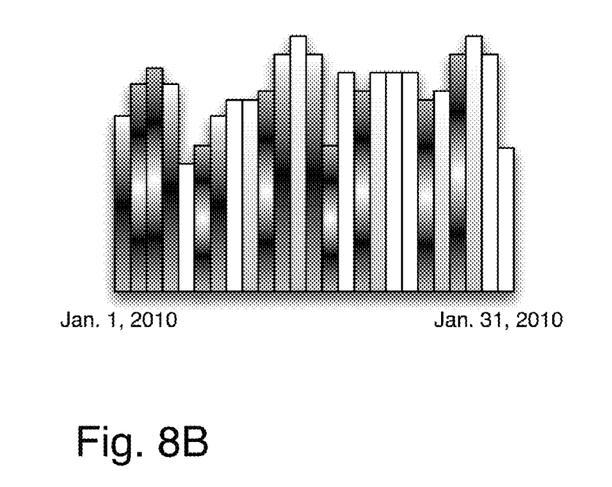

In one embodiment, the system provides a visual display that can be zoomed into and out of, to provide a continuous display of data that is altered in the display format, depending on the zoom level. FIG. 8B shows an exemplary more zoomed-out view.

In one embodiment, the system provides an easy way for a user to adjust the user goals. In one embodiment, an "overall movement goal" such as 10,000 steps taken through the day may be set by the user. The user can then adjust the goal activity level throughout the day, to get a visual indication of how active he or she needs to be during various parts of the day. In one embodiment, the user may also set additional goals, such as sleep goals, exercise goals, etc. In one embodiment, these goals may also be displayed and adjusted via the user interface.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
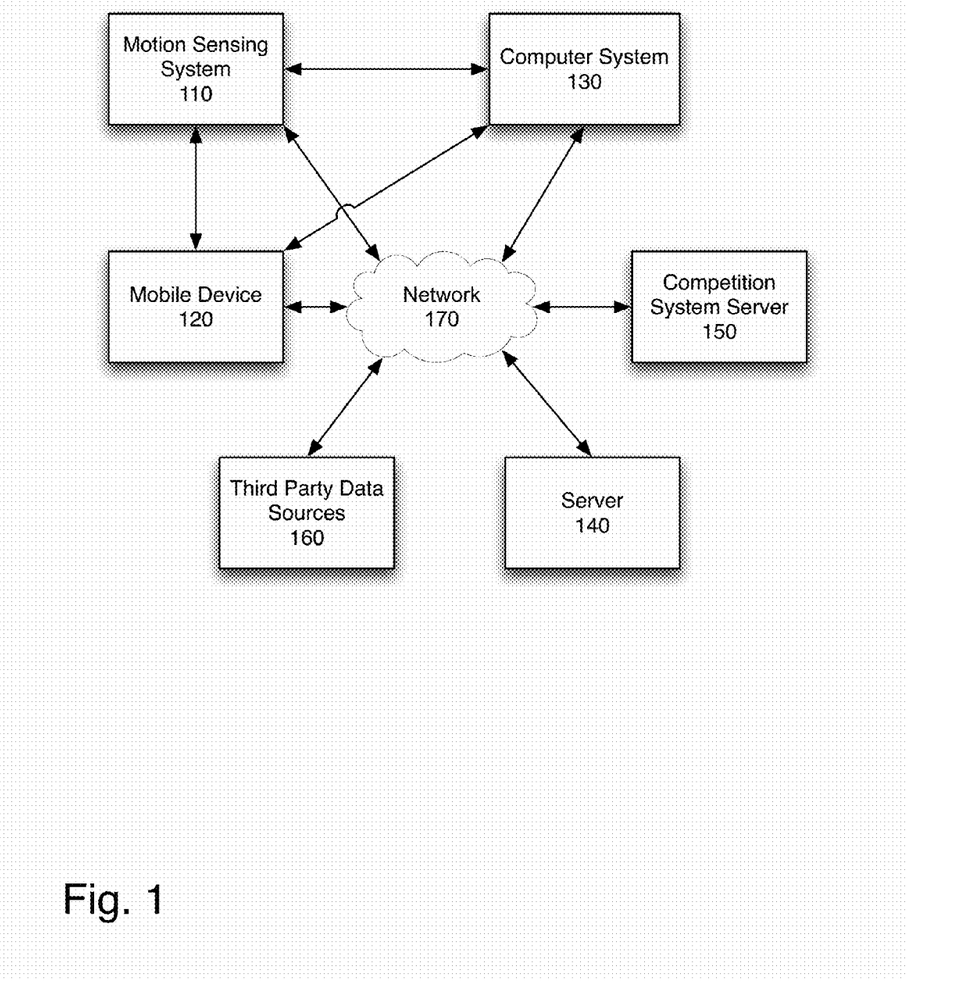
FIG. 1 is a diagram of one embodiment of a network in which the present invention may be implemented.

FIG. 1 is a diagram of one embodiment of a network in which the present invention may be implemented. The system includes a motion sensing system 110. The motion sensing system 110 may be a wristband, or other body-worn system that includes an accelerometer or another motion sensor. The motion sensing system may include other sensors to obtain information such as body temperature, ambient temperature, light level, UV level, and other relevant data. This data may be used to accurately track the user's activity and sleep. In one embodiment, motion sensing system may also include additional sensors or input mechanisms to enable a user to indicate his or her mood, consumption, exercise, medications, health issues, etc.

The motion sensing system 110 may be coupled to a network 170. In one embodiment, the motion sensing system 110 may be coupled directly to a mobile device 120 and/or computer system 130. The motion sensing system 110 in one embodiment may include a processor, or processing systems that can analyze the data, and provide user interface features. In another embodiment, the motion sensing system 110 may include only the motion sensor, memory to store the motion data, and communication logic to enable the data to be communicated via network 170, mobile device 120, and/or computer system 130. In another embodiment, motion sensing system 110 may be incorporated into mobile device 120.

Mobile device 120 in one embodiment is a smart phone, such as the iPhone® by Apple Computers®, or an Android® Operating System-based mobile phone, or another smart phone which includes the ability to receive and process data, and display data. The mobile device 120 may provide user interface features to provide a display as will be described in more detail below. The computer system 130 may include an application to provide user interface features to display information based on the analysis of the motion data to the user.

In one embodiment, the user interface features may also be provided via server 140. In one embodiment, the server 140 may provide user interface data through a website or similar portal. In one embodiment, in addition to the user's own data, competition system server 150 may enable user to have a competition with one or more other users. The competition system server 150 in one embodiment, normalizes data, and enables users having different levels of athleticism to compete. In one embodiment, the method used in U.S. Pat. No. 7,647,196 may be utilized for this feature.

In one embodiment, the system may utilize data from third party data sources 160. The third party data sources 160 may include sites providing weather, air quality, and other environmental or local information. In one embodiment, the user may further input user health data, through a user interface in motion sensing system 110, mobile device 120, and/or computer system 130. In one embodiment, such user personal data may also be obtained, with user authorization, from a healthcare provider. In one embodiment, the data stored on the system does not include confidential health data. User health data may include the user's mood, the user's health status, the user's medications and drugs taken, etc. In one embodiment, the user may further input food consumption information. In one embodiment, this may be done in various ways, including using photographs, scans of cans, manual entry, selection from a database, or other methods.

Figure 2:
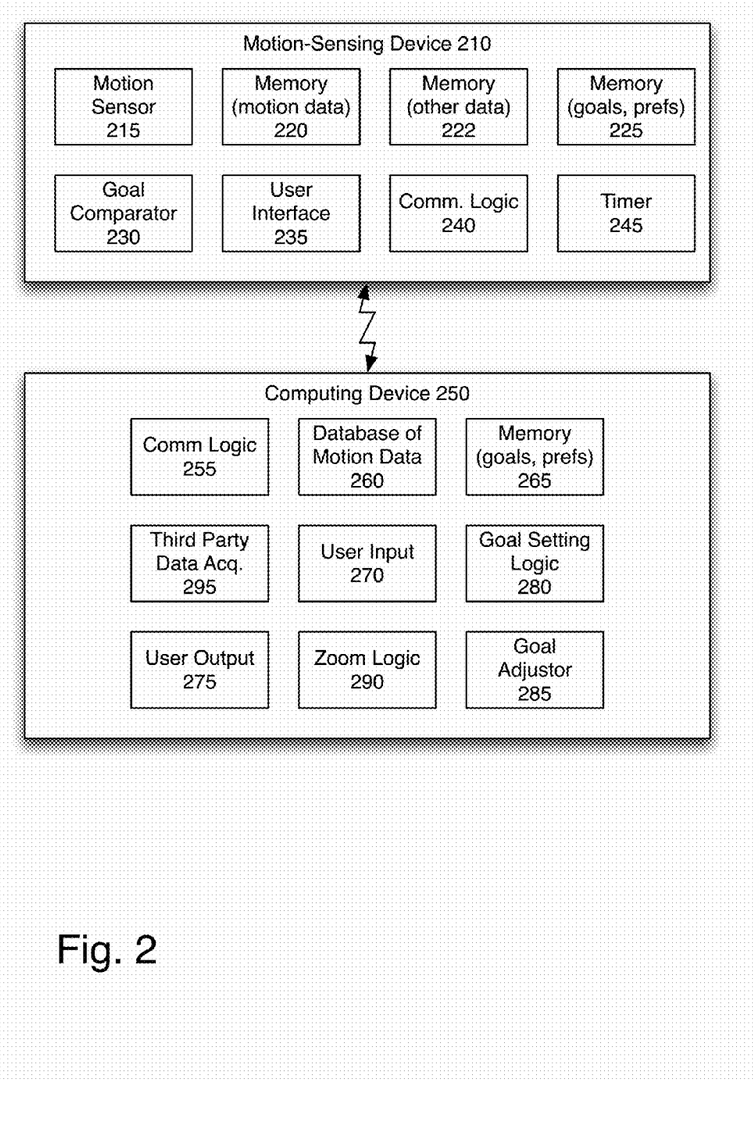
FIG. 2 is a block diagram of on embodiment of the computing system and accelerometer system.

FIG. 2 is a block diagram of on embodiment of the computing system and motion-sensing device. The motion sensing device 210 in one embodiment is implemented in a wristband. The motion sensing device 210 includes motion sensor 215, such as one or more accelerometers, gyroscopes, or other sensors to track user movements. In one embodiment, the motion sensing device 210 may be implemented in two separate devices, a small portable device and a larger mobile component. In another embodiment, the motion sensing device 210 is self-contained device.

The memory 220 stores motion data. In one embodiment, the motion data is pre-processed, prior to storage in memory 220. Memory 222 stores other data, such as data from other sensors, data from entered by the user, and other relevant data. A memory 225 stores goals and user preferences, in one embodiment. These goals may include activity goals, exercise goals, medication to be taken, etc. In one embodiment, those goals that influence user feedback provided by the motion-sensing device are stored, while other goals are not. For example, a user may set a preference that he or she should be alerted when a goal curve is missed by more than a certain time, or more than a certain activity level. A user may set a preference to be alerted when he or she has been inactive for more than a preset time. The user may also set up alerts for medications to be taken, exercise to be performed, meals to be eaten, etc.

In one embodiment, these settings are stored on the motion sensing device 210. In one embodiment, the motion sensing device is actually two devices, a motion sensor and communication logic, and an associated mobile device which receives motion data from the motion sensor, and performs the processing described.

In one embodiment timer 245 is used for any timing-related preferences and goals. In one embodiment, timer 245, and other elements of the system, may be turned off when no activity is detected by motion sensor 215. In one embodiment, motion sensor 215 is temporarily disconnected when a vibration-based notification is being sent, as part of the user interface 235, to eliminate the detection of phantom motion. In one embodiment, by disconnecting the motion sensor 215 for the short period during which any vibration system is being used for notification, the system also removes false positives.

Goal comparator 230 compares the goals and preferences to the current data, based on the data in memory 220, 222, and 225. The output of the goal comparator 230 may send information to the user interface 235.

User interface 235 provides feedback to the user, in one embodiment. User interface 235 may further provide a means for a user to enter data, such as preference data. In one embodiment, user interface 235 may include a display screen, a touch screen, one or more buttons, and/or other interface features. In one embodiment, user interface 235 may include LEDs (light emitting diodes) or similar visual feedback. In one embodiment, a simple light indicator may indicate how well the user is doing on his or her movement goals. For example, a light indicator may shade from red (far from goal) to green (meeting goal). In one embodiment, this may be implemented with two LEDs, red and green. In one embodiment, gradations between the red and green may provide additional information about how close the user is to his or her goal. In one embodiment, additional indicators may be associated with additional goals, such as mood goals, exercise goals, medication goals, etc. Such indicators may be use the same indicator, or separate indicators. In one embodiment, user interface 235 may include a vibration system to provide tactile feedback to the user. The user interface 235 may further include a speaker, to provide audio feedback. The audio feedback may include spoken instructions or reminders, tones, or other types of audio feedback. In one embodiment, the instructions may include coaching for the user, for exercise.

Communication logic 240 enables a connection between motion-sensing device 210 and computing device 250, and other external resources. Communication logic 240 may be an audio jack designed to plug into the audio connection of a mobile device or computer system. Communication logic 240 may be a wireless network connection, a cellular network connection, a personal area network connection, or another method of communicating data from motion-sensing device 210. In one embodiment, the communication logic 240 may enable the user to share data directly from the motion-sensing device 210 to third parties such as social media networks, other people, and/or servers.

Computing device 250 receives data from motion-sensing device 210, via its own communication logic 255. The motion data, in one embodiment, is stored in database 260. The goal setting logic 280 enables the system to set automatic goals, and/or receive goal information from a user via user input interface 270. The goals and preferences are stored in memory 265, and transmitted to motion-sensing device 210 if they will impact the motion sensing device's interaction with the user. In one embodiment, preferences and goals are transmitted, whether or not there are feedback-related uses of this information.

Goal adjustor 285 can automatically adjust the goals stored in memory 265, based on an analysis of the actual motion data and observed and analyzed patterns. In one embodiment, third party data, acquired by third party data acquisition logic 295 may be used by goal adjustor 285. The third party data may also be used by a user, to manually adjust goals, via user input 270.

User output 275 enables the computing device 250 to provide a graphical display to the user. In one embodiment, the motion-sensing device 210 does not have a full graphical output, so the visual representation of the user's progress and current status is provided via user output 275 on computing device 250. In another embodiment, both devices may provide visual feedback including the visual graphs discussed in more detail below.

In one embodiment, the user may share the users activity and other data to a server, or to another individual, or to third parties via a social network In one embodiment, the system may be set up to automatically share this data with designated third parties.

Figure 3:
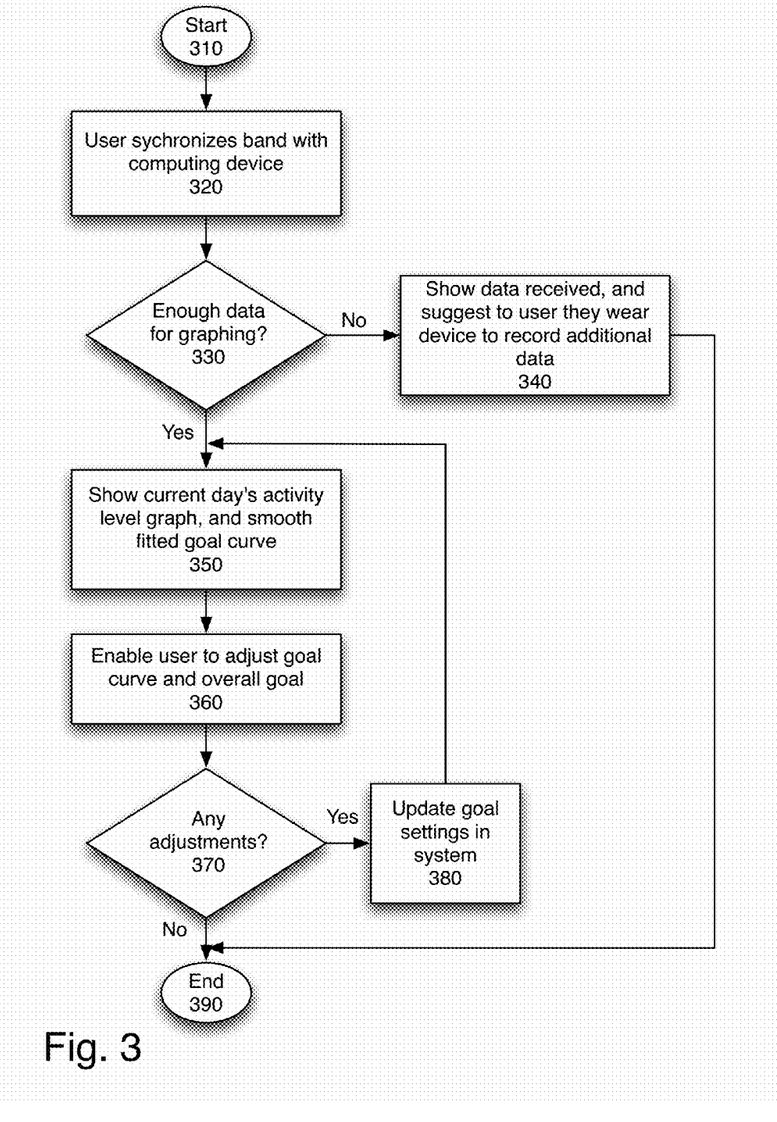
FIG. 3 is a flowchart of one embodiment of using the data in a display.

FIG. 3 is a flowchart of one embodiment of using the data in a display. The process starts at block 310. At block 320, the user synchronizes the band with a computing device. The computing device may be a computing device, which may be a mobile device or computer system or server. In another embodiment, the device may be integrated into a computing device, and this step may not occur.

At block 330, the process determines whether there is enough data for graphing. In one embodiment, at least one full day of data is needed to display a graph. In another embodiment, at least one time unit of data is needed. In one embodiment, more than one day of data is needed. If there is not enough data for graphing, in one embodiment at block 340, the data received to date is shown to the user. In one embodiment, the user is prompted to wear the device to record additional data. The process then ends at block 390.

If there is enough data for graphing, the process continues to block 350. At block 350, the current day's activity is shown, using activity level graph, and the smooth fitted goal curve is overlaid over the current day's activity. In one embodiment, the past 24 hours are displayed as the current day's activity. In another embodiment, a current day, starting at midnight, and going to the current time, is shown.

Figure 7B:
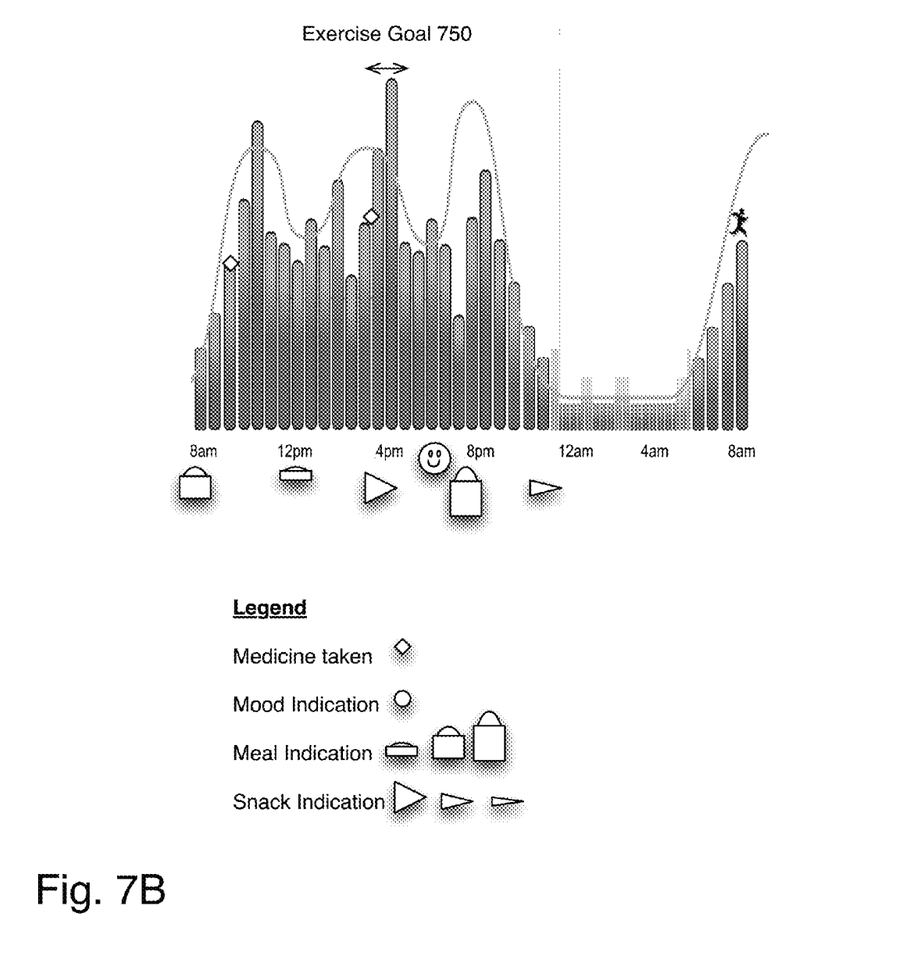
FIG. 7B is an illustration of one embodiment including the activity goal curve along with additional goals and indications.

In one embodiment, in addition to the daily activity, other daily, or weekly, goals are also shown. For example, exercise goals may be indicated, by showing when activity met exercise levels, and medications taken may be indicated. In one embodiment, the user may also indicate his or her mood, and this information may be shown as well. Additionally, the user's food consumption may be shown. In one embodiment, the user's food consumption may be shown by indicating that the user had a meal or a snack, at a particular time. In one embodiment, the system may further show the size of the meal or snack. As shown in FIG. 7B, the size of the image may indicate the size of the meal or snack, and its placement may indicate the timing. FIG. 7B shows a small arrow encompassing the period during which the user did exercise 750, and diamonds indicating when the user took his or her medications. Of course the exemplary illustrations shown in the figures are merely shown as examples. The actual graphics may be different.

At block 360, the user can adjust the activity goal curve, and overall activity goal. In one embodiment, the goal curve shows the goal activity level for each time segment of the day. In one embodiment, the user may adjust The overall goal, e.g. the overall daily activity level. In one embodiment, the user may adjust the goal curve, to shift activity level within the day, while maintaining the overall daily activity level. In one embodiment, the user may adjust either or both goals. In one embodiment, additional goals, such as exercise level or food eaten may also be adjusted, if they are included on the display.

At block 370, the process determines whether the user made any adjustments. If so, at block 380 the goal settings in the system are updated, and the process returns to block 350, to show the user's activity level and the goal curve based on the updated information. In one embodiment, when the adjustments to the goals are made on a computing device that is not the motion sensing device, the new goal settings are propagated to the motion sensing device (e.g. band or other body-worn component) at a subsequent synchronization. If no adjustments were made, the process ends at block 390.

Figure 4:
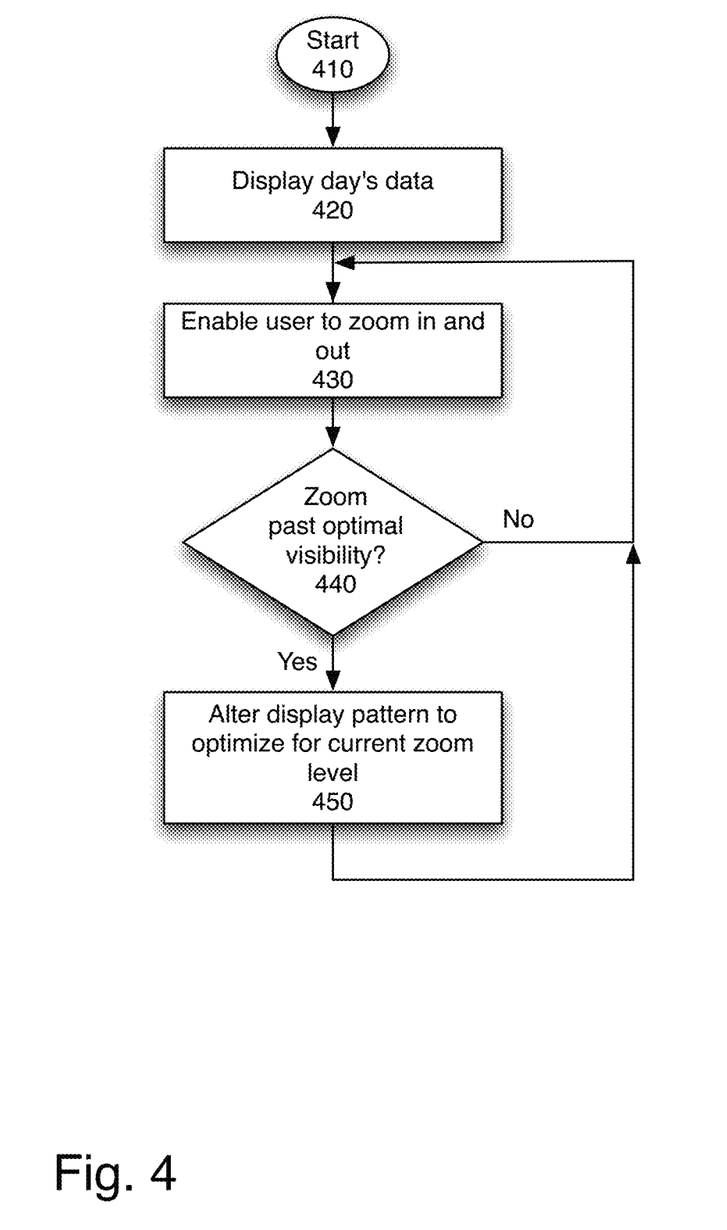
FIG. 4 is a flowchart of one embodiment of data display.

FIG. 4 is a flowchart of one embodiment of data display. In one embodiment, displaying the data, as discussed above with respect to block 350, may further provide a way for a user to alter the view. The process starts at block 410. At block 420, the day's data is displayed. This corresponds to block 350 above, in one embodiment. In one embodiment, the default display is as shown in FIG. 7A. FIG. 7B shows an alternative display, at the same zoom level, with additional information.

At block 430, the system enables zooming in and out. In one embodiment, zooming out shows more data, e.g. instead of one day, more, up to a full month of data in one embodiment.

At block 440, the process determines whether the system has zoomed in or out past the optimal visibility, for the current display format. If not, the process returns to block 430 to further enable zooming.

If the system has zoomed past the optimal visibility, at block 450 the display is altered to optimize for the current zoom level. In one embodiment, the furthest detail zoom is to show movement detected in one hour. In one embodiment, at this level of zoom, the display shows a current number of steps, showing the timing of when steps were taken. FIG. 8A shows one embodiment of this level of zoom.

In one embodiment, the least detail zoom shows one month of time. FIG. 8B shows one embodiment of this level of zoom. In this level of zoom, in one embodiment, a single line represents each day, and shading, color, or other indicators show the various aspects of the day. For example, a height of the bar may show whether the activity goal level was met, and a color, pattern, or shading may show whether a sleep goal was met. Alternative display formats may be used. In one embodiment, the size, pattern, color, shading, and shape of the line may each provide one aspect of information. In one embodiment, these aspects may include the meeting of activity goals, sleep goals, exercise goals, food consumption goals, as well as mood and other information, and/or other aspects of data that may be gathered about the user.

The process then returns to block 430, to further permit the user to zoom in or out. Although the examples are one hour and one month, in one embodiment, the data may further be broken down into greater detail, or presented in broader summary. By optimizing the display for the various zoom levels, the user can easily explore the range of data available.

Figure 5:
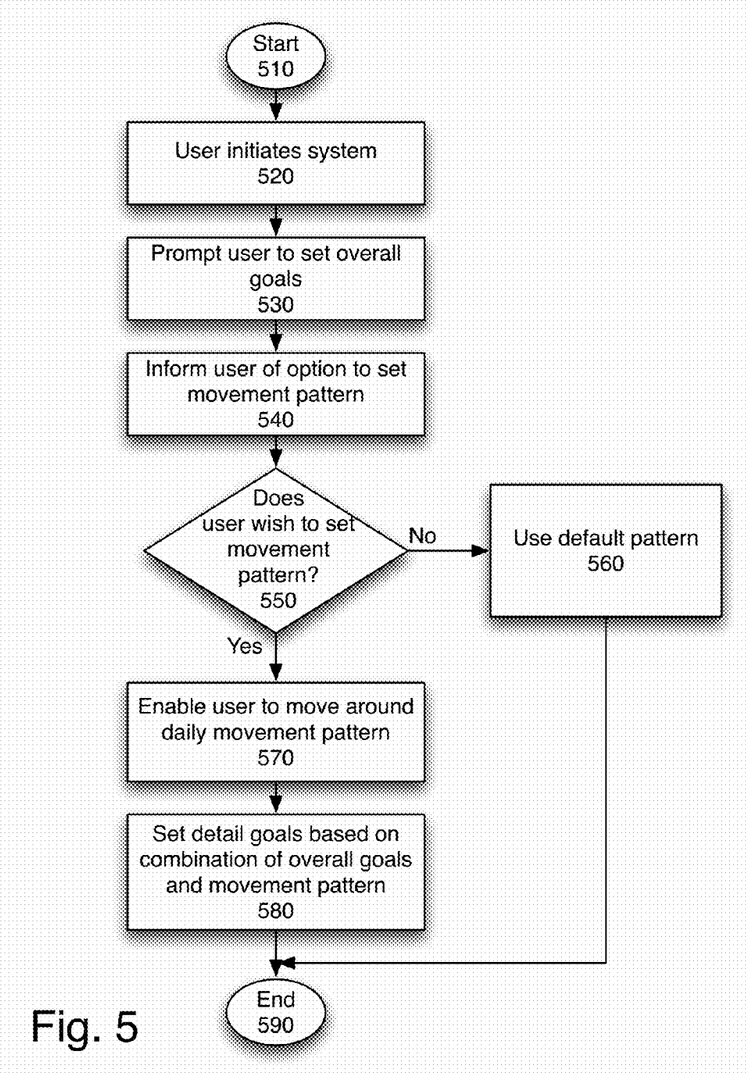
FIG. 5 is a flowchart of one embodiment of configuring the system.

FIG. 5 is a flowchart of one embodiment of configuring the system. The process starts at block 510. At block 520, the user initiates the system. At block 530, the user is prompted to set overall goals. The overall activity goal, for example, may be to take 10,000 steps. The overall sleep goal may be to sleep for 7 hours per night.

At block 540, the system informs the user of the option to set a movement pattern, or goal curve. This divides the daily goal into more specific detail, showing an expected movement pattern through the day.

At block 550, the process determines whether the user wishes to set a movement pattern. If the user does not wish to set a movement pattern, at block 560 the default pattern is used. In one embodiment, the default pattern assumes a relatively sedentary day, with periods of activity before work, at lunch, and after work, and a time for working out either in the morning or the evening. In one embodiment, there may be different default patterns for different days. For example, workdays tend to have more sedentary patterns than weekends. In one embodiment, the default pattern provided uses the likely pattern. In one embodiment, the actual default pattern is evolved as data is collected on the actual movement patterns of many users. The process then ends at block 590.

At block 570, the user can move around the daily movement pattern. In one embodiment, the system initially displays one or more possible default patterns, showing various types of distributions of activity levels. For example, there may be proposed patterns for someone who is active in the morning, someone whose primary activity is in the evening, someone with an active job who is active throughout the day, etc. The user may select one of these proposed movement patterns as the basis, and then make further adjustments based on the user's knowledge of his or her own behaviors.

In one embodiment, in addition to activity goals, the user may set goals for time going to bed, sleep length, etc. Additional goals may include exercise levels (e.g. aerobic exercise at least three times a week and strength training two times a week), mood levels (overall positive mood for the week), food consumption goals (1600 calories per day, and/or three main meals eaten with two snacks, and/or larger meals eaten before 5 p.m., etc.), and other goals associated with the user's behaviors. Additional information may also include prescription and over-the-counter medications and other drugs consumed by the user.

In one embodiment, the user interface enables the user to physically move around a smooth curve representing the goal movement pattern. The smooth curve, in one embodiment, acts like a rubber band, such that the overall total activity level is maintained, as the user moves around the movement pattern. The user may also alter the overall activity goal. In one embodiment, when the overall activity level is reduced or increased, the activity level is changed proportionately across the day.

At block 580, the detailed goals are set based on the combination of the overall activity and sleep goals and the curves selected by the user. For example, the user may indicate that he or she expects to be active in the morning at a medium level, and evening at a high level, and have low activity levels between those times. In order to achieve an overall goal of 10,000 steps the system may set a 3,000 step goal in the morning, 2,000 during the low activity day, and 5,000 in the evening. In one embodiment, the detailed goals may also include exercise, food, mood, and sleep goals, as discussed above. The process then ends.

Figure 6:
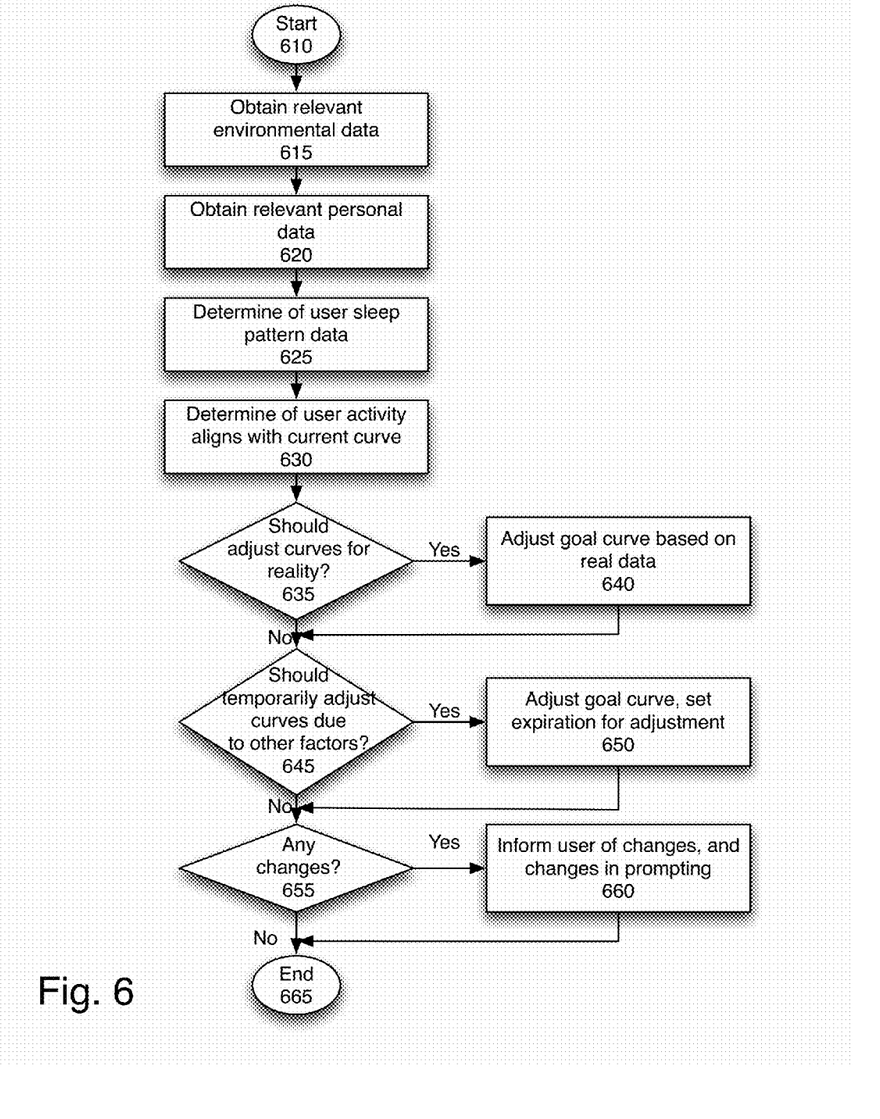
FIG. 6 a flowchart of one embodiment of automatic adjustment of the goal curve.

In one embodiment, the system may automatically adjust the goal patterns/curves, based on real data for the user, and on external data. FIG. 6 a flowchart of one embodiment of automatic adjustment of the activity goal curve. Some users may not be aware of their actual activity patterns. Therefore, in one embodiment, the system can automatically adjust the goal curves based on the observed data. In one embodiment, the user may set up the automatic adjustments, or disable them.

The process starts at block 610. In one embodiment, this process runs periodically. In one embodiment, this process runs automatically whenever the motion sensing device is synchronized with a computing system, such as a mobile device, a computer, or a server. In one embodiment, when the motion sensing device includes the computing system, the process may run periodically, when the system is not being used.

At block 615, the process obtains relevant environmental data. This relevant data may include the current season, sunrise and sunset, weather, air quality, pollen count, and other aspects of the environment.

At block 620, the process obtains relevant personal data associated with the user. This may be data entered by the user, e.g. weight information, mood information, health information, medication information, cyclic information, etc. In one embodiment, this data may be obtained from the user. In one embodiment, this may include data obtained via a permitted link to the user's medical records. Other permitted means of obtaining personal data may be used.

At block 625, the process obtains the user's sleep pattern data. In general, a user's sleep patterns correlate with the user's activity patterns. Furthermore, the activity patterns' beginning and end are defined by the user's sleep patterns.

At block 630, the process determines whether the user's activity throughout the day has been in alignment with the goal curve. In one embodiment, this is independent of whether the user has been meeting or exceeding the overall goals. For example, if the user sets the goal pattern of being active in the morning and then immediately after work, the process determines if these two time areas correspond with the actual areas of higher activity for the user.

At block 635, the process determines whether sleep patterns or activity patterns indicate that the user's goals are not aligned with reality. Some users may initially use the default goal patterns, without considering their own reality. For example, a night owl would likely not be highly active between 7 a.m. and 8:30 a.m., while an early riser would likely not be active between 10 p.m. and midnight.

If the user's goals and real timing of activity levels do not align, the process continues to block 640. At block 640, the process determines a more effective pattern for the user. This is based on the user's historical activity level, sleep patterns, and any other available information. The process then continues to block 645.

If, at block 635, no difference was found, the process continues directly to block 645.

At block 645, the process determines whether any external factors, e.g. personal data or environmental data, may cause a temporary adjustment to the goal patterns. For example, if the user has a cold, the goals may be reduced to a lower level of activity. Or if the weather is predicted to be bad in the evening, the user's activity goals may be moved earlier in the day. Other adjustments, based on a combination of the user's activity habits, health and other personal information, and environmental data may be used to temporarily adjust the user's goals.

If there are such factors, at block 650, the goal patterns are temporarily adjusted. In one embodiment, the adjustment may have an expiration associated with it. For example, for an adjustment due to inclement weather, the goals may be temporarily adjusted with the setting to "reset" when the weather pattern has passed. Similarly, adjustments due to environmental or personal conditions may expire. The process then continues to block 655.

If there are no external factors that would prompt an adjustment to the goal curve, the process continues directly to block 655.

At block 655, the process determines whether any significant changes were made. If so, at block 655, the process informs the user of the changes to the pattern, at block 660. In one embodiment, the system provides user feedback, when the motion-sensing device is worn, to prompt the user to adjust his or her activity level to meet the goal curve patterns. Therefore, a change to the goal curve would cause the user to be differently prompted. It is useful to make the user aware of such adjustments before the goals have been missed. In one embodiment, a similar process may be used to adjust the users sleep patterns, medication patterns, eating patterns and exercise patterns. But basing the user's goals going forward with the realistic data derived from the user's history and the environmental and other external factor, the system can ensure that the user's goals are achievable. The process then ends at block 665. If no changes were found, at block 655, the process ends at block 665.

Figure 9:
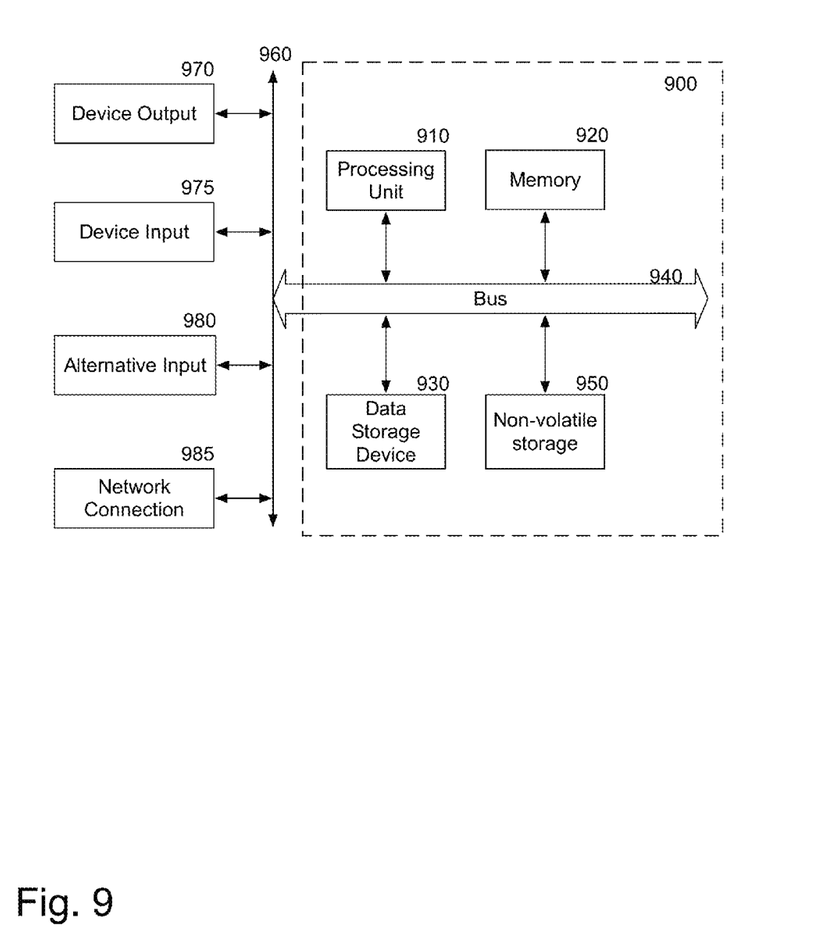
FIG. 9 is a block diagram of one embodiment of a computer system that may be used with the present invention.

FIG. 9 is a block diagram of a particular machine that may be used with the present invention. It will be apparent to those of ordinary skill in the art, however that other alternative systems of various system architectures may also be used.

The data processing system illustrated in FIG. 9 includes a bus or other internal communication means 940 for communicating information, and a processing unit 910 coupled to the bus 940 for processing information. The processing unit 910 may be a central processing unit (CPU), a digital signal processor (DSP), or another type of processing unit 910.

The system further includes, in one embodiment, a random access memory (RAM) or other volatile storage device 920 (referred to as memory), coupled to bus 940 for storing information and instructions to be executed by processor 910. Main memory 920 may also be used for storing temporary variables or other intermediate information during execution of instructions by processing unit 910.

The system also comprises in one embodiment a read only memory (ROM) 950 and/or static storage device 950 coupled to bus 940 for storing static information and instructions for processor 910. In one embodiment the system also includes a data storage device 930 such as a magnetic disk or optical disk and its corresponding disk drive, or Flash memory or other storage which is capable of storing data when no power is supplied to the system. Data storage device 930 in one embodiment is coupled to bus 940 for storing information and instructions.

The system may further be coupled to an output device 970, such as a cathode ray tube (CRT) or a liquid crystal display (LCD) coupled to bus 940 through bus 960 for outputting information. The output device 970 may be a visual output device, an audio output device, and/or tactile output device (e.g. vibrations, etc.).

An input device 975 may be coupled to the bus 960. The input device 975 may be an alphanumeric input device, such as a keyboard including alphanumeric and other keys, for enabling a user to communicate information and command selections to processing unit 910. An additional user input device 980 may further be included. One such user input device 980 is cursor control device 980, such as a mouse, a trackball, stylus, cursor direction keys, or touch screen, may be coupled to bus 940 through bus 960 for communicating direction information and command selections to processing unit 910, and for controlling movement on display device 970.

Another device, which may optionally be coupled to computer system 900, is a network device 985 for accessing other nodes of a distributed system via a network. The communication device 985 may include any of a number of commercially available networking peripheral devices such as those used for coupling to an Ethernet, token ring, Internet, or wide area network, personal area network, cellular network, wireless network or other method of accessing other devices. The communication device 985 may further be a null-modem connection, or any other mechanism that provides connectivity between the computer system 900 and the outside world.

Note that any or all of the components of this system illustrated in FIG. 9 and associated hardware may be used in various embodiments of the present invention.

It will be appreciated by those of ordinary skill in the art that the particular machine, which embodies the present invention may be configured in various ways according to the particular implementation. The control logic or software implementing the present invention can be stored in main memory 920, mass storage device 930, or other storage medium locally or remotely accessible to processor 910.

It will be apparent to those of ordinary skill in the art that the system, method, and process described herein can be implemented as software stored in main memory 920 or read only memory 950 and executed by processor 910. This control logic or software may also be resident on an article of manufacture comprising a computer readable medium having computer readable program code embodied therein and being readable by the mass storage device 930 and for causing the processor 910 to operate in accordance with the methods and teachings herein.

The present invention may also be embodied in a handheld or portable device containing a subset of the computer hardware components described above. For example, the handheld device may be configured to contain only the bus 940, the processor 910, and memory 920 and/or 950.

The handheld device may be configured to include a set of buttons or input signaling components with which a user may select from a set of available options. These could be considered input device #1 975 or input device #2 980. The handheld device may also be configured to include an output device 970 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processing unit 910, a data storage device 930, a bus 940, and memory 920, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network connection 985.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 910. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

The media sharing and display application and method described provides a method of sharing photos and videos with others, so that the media shared can be enjoyed recurrently on their computer desktop or mobile device, and can be easily updated remotely by others, who have permission. It enables one group of persons, the senders, to transform the computer or mobile device of another group, the recipients, into a digital picture and video frame and to keep that frame updated with fresh photos and videos on an ongoing basis with minimal or no ongoing effort from the recipient(s). Although the above description provided, for example, only for a single frame, one of skill in the art would understand that the invention encompasses other logical uses of the system, for example having multiple frames, having "frames" which are three-dimensional, displaying media that is neither video nor photograph, but a third format, etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A visual display of user data on a display of a computer system, the user data representing actual motion data based on data from a motion sensor and transformed to a visual representation, the visual display comprising:
 a first plurality of time units, indicating an activity level for each time unit during a diurnal portion of a day;
 a fitted smooth goal curve, indicating a goal activity level, the goal activity level indicating a goal activity level for each of the first time units, the goal activity level based on an overall goal setting and a goal curve defining activity levels throughout the day;
 wherein the user can adjust the goal curve, in a manner to maintain an overall activity level while altering the goal activity level for individual time units.

2. The display of claim 1, further comprising:
 a second plurality of time units, indicating a sleep phase for each time unit during a nocturnal portion of the day.

3. The display of claim 1, wherein the user can adjust the goal, the adjustment maintaining a distribution of the goal activity level for individual time units.

4. The display of claim 1, wherein a user interface enables a user to move the smooth fitted goal curve on a display to adjust the goal curve.

5. The display of claim 1, further comprising:
 zoom logic to enable a user to zoom, to see a different segment of time on the display.

6. The display of claim 5, wherein the display shows a complete graphical timeline for a day, when the display is zoomed out, the timeline including information about a plurality of: activity level, sleep level, exercise level, food consumption, and mood.

7. The display of claim 1, wherein the display further indicates additional information about the user's actions, wherein the additional information may include one or more of: mood information, food consumption information, medication information, and exercise information.

8. The display of claim 7, wherein one or more of the additional information may have a goal associated with it.

9. A system comprising:
 a store of motion data, received from a motion-sensing device;
 a user output interface to output a user's progress and goals, the user progress displayed in a first plurality of time units based on the motion data, and the user goals displayed as a smooth curve based on a distribution of activity throughout a day and an overall activity goal, the user goals overlaid on an illustration of the user's performance;
 a goal adjustor to enable a user to adjust the smooth curve, to alter the distribution of the activity throughout the day, in a manner to maintain an overall activity level while altering the goal activity level for individual time units.

10. The system of claim 9, further comprising:
 a goal adjustor to enable a user to reduce an overall activity level, the reduction maintaining the distribution of the activity throughout the day.

11. The system of claim 9, wherein a user interface enables a user to move the smooth fitted goal curve on a display to adjust the goal curve.

12. The system of claim 9, further comprising:
 a goal adjustor to automatically adjust the goal smooth curve, to alter the distribution for the activity throughout the day based on data in the database.

13. The system of claim 9, wherein the goals further include sleep goals displayed a second plurality of time units, indicating a sleep phase for each time unit during a nocturnal portion of the day.

14. The system of claim 9, further comprising:
 zoom logic to enable a user to zoom, to see a different segment of time on the display.

15. The system of claim 14, wherein the display shows a complete graphical timeline for a day, when the display is zoomed out, the complete graphical timeline including information about a plurality of: activity level, sleep level, exercise level, food consumption, and mood.

16. The system of claim 9, wherein the user interface displays additional information about the user's actions, and the additional information includes one or more of: mood information, food consumption information, medication information, and exercise information.

17. A system including a motion sensing device comprising:
- a motion sensor to detect user motions;
- memory to store the motion data;
- a memory to store a plurality of goals; and
- a goal comparator to compare the motion data performed per time unit to a goal level, and to alert the user when the motion per time unit is below the goal level; and
- a user interface to display a first plurality of time units, indicating an activity level for each time unit during a diurnal portion of a day, and a fitted smooth goal curve, indicating a goal activity level, the goal activity level indicating a goal activity level for each of the first time units, the goal activity level based on an overall goal setting and a goal curve defining activity levels throughout the day;
- wherein the display shows a complete graphical timeline for a day, when the display is zoomed out, the complete graphical timeline including information about a plurality of: activity level, sleep level, exercise level, food consumption, and mood.

18. The system of claim 17 further comprising:
- a communication logic to send data to a computing device; and
- the computing device further to provide one or more: an improved user interface, processing power, and a sharing interface.

19. The system of claim 17, further comprising:
- the memory to store additional information, the additional information comprising one or more of: mood information, food consumption information, medication information, and exercise information.

20. The system of claim 17, further comprising:
- the user interface further to display sleep data, displayed with second plurality of time units, indicating a sleep phase for each time unit during a nocturnal portion of the day.

* * * * *